(12) United States Patent
Angot et al.

(10) Patent No.: US 8,590,987 B2
(45) Date of Patent: Nov. 26, 2013

(54) IDLER AND UNDERCARRIAGE ASSEMBLY FOR TRACK-TYPE MACHINE

(75) Inventors: Daniel Angot, Peoria, IL (US); Roger E. Lawson, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 271 days.

(21) Appl. No.: 12/631,028

(22) Filed: Dec. 4, 2009

(65) Prior Publication Data

US 2010/0156169 A1    Jun. 24, 2010

Related U.S. Application Data

(60) Provisional application No. 61/193,724, filed on Dec. 18, 2008.

(51) Int. Cl.
*B62D 55/14* (2006.01)

(52) U.S. Cl.
USPC .......................................... 305/199; 305/137

(58) Field of Classification Search
USPC .......... 305/185, 194, 195, 196, 199, 201, 137
See application file for complete search history.

(56) References Cited

U.S. PATENT DOCUMENTS

| | | | |
|---|---|---|---|
| 1,367,820 A | | 2/1921 | Knaggs |
| 2,189,160 A | * | 2/1940 | Baker et al. ............... 305/138 |
| 2,827,337 A | | 3/1958 | Buffum |
| 3,116,957 A | | 1/1964 | Fikse |
| 3,603,650 A | * | 9/1971 | Miller ............................ 305/137 |
| 3,762,012 A | | 10/1973 | Aker |
| 3,771,843 A | * | 11/1973 | Clasper et al. ............... 474/187 |
| 3,887,244 A | * | 6/1975 | Haslett et al. ............... 305/197 |
| 4,306,753 A | * | 12/1981 | Livesay et al. ............... 305/201 |
| 4,961,395 A | | 10/1990 | Coast |
| 5,183,318 A | * | 2/1993 | Taft et al. ........................ 305/185 |
| 5,207,489 A | * | 5/1993 | Miller ............................ 305/137 |
| 6,012,784 A | * | 1/2000 | Oertley ........................... 305/137 |
| 6,074,023 A | | 6/2000 | Satou et al. |
| 6,322,173 B1 | * | 11/2001 | Maguire et al. ............... 305/185 |
| 6,474,754 B1 | | 11/2002 | Hasselbusch |
| 7,374,257 B2 | | 5/2008 | Oertley |
| 2005/0040708 A1 | * | 2/2005 | Yamamoto et al. ........... 305/202 |
| 2005/0253453 A1 | | 11/2005 | Miller |
| 2006/0043791 A1 | * | 3/2006 | Sho et al. ....................... 305/198 |
| 2007/0057575 A1 | * | 3/2007 | Brandt et al. ................. 305/136 |

FOREIGN PATENT DOCUMENTS

| | | | |
|---|---|---|---|
| EP | 1995161 A1 | * | 11/2008 |
| JP | 61024675 A | * | 2/1986 |
| JP | 2001219876 | | 8/2001 |
| JP | 2001334969 | | 12/2001 |
| JP | 2002166863 A | * | 6/2002 |
| JP | 2005255043 | | 9/2005 |

* cited by examiner

*Primary Examiner* — Kip T Kotter
(74) *Attorney, Agent, or Firm* — Finnegan, Henderson, Farabow, Garrett & Dunner LLP

(57) ABSTRACT

An idler of an undercarriage assembly for a track-type machine is disclosed. The undercarriage assembly may have at least two links, which may be interconnected by a cartridge. The cartridge may have a bushing disposed about and rotatable relative to a pin. At least one of the links may have a link rail wear surface, which may be positioned an original wear surface height from the bushing. The idler may have a lower surface, which may be configured to wear against the link rail wear surface. The idler may also have an upper surface, which may be configured to wear against the bushing. The upper surface may be positioned radially outward of the lower surface by an original upper surface height. The original upper surface height may be between approximately 70% and approximately 90% of the original wear surface height.

20 Claims, 6 Drawing Sheets

IDLER AND UNDERCARRIAGE ASSEMBLY FOR TRACK-TYPE MACHINE

CROSS-REFERENCED TO RELATED APPLICATIONS

This application claims benefit of U.S. Provisional Application No. 61/193,724 filed Dec. 18, 2008.

TECHNICAL FIELD

The present disclosure relates generally to an undercarriage assembly for a track-type machine and, more particularly, to an idler of an undercarriage assembly for a track-type machine.

BACKGROUND

Some track assemblies of track-type machines include a pair of parallel track chains, which include a plurality of links that are interconnected by laterally disposed pins. A bushing is disposed about each pin such that it can rotate relative to the pin and the links. The bushings are engaged by a drive sprocket that propels the track assembly. Specifically, the track assembly is rotated about guide rollers and an idler. As the track assembly rotates, it engages a ground surface and propels the machine. Unfortunately, rotating the track assembly about the idler can cause undesirable noise and link wear.

One way to reduce noise caused by rotating a track assembly about an idler is to reduce direct contact between the track assembly and the idler. An example of this strategy is described in U.S. Patent Application Publication No. 2005/0253453 A1 (the '453 publication) by Miller, published on Nov. 17, 2005. The '453 publication describes an idler wheel including a plurality of axially spaced annular rims. A first and a second one of the rims are arranged on opposite sides of the idler wheel. These rims, which have substantially equal diameters, support and guide links of a chain about the idler wheel. A central rim, having a larger diameter than the first and the second one of the rims, is positioned between the first and the second one of the rims. And, an elastomeric ring circumferentially surrounds the central rim. The elastomeric ring is adapted to directly and resiliently engage pin and bushing assemblies, thereby reducing contact noise between a track (including links that are interconnected by the pin and bushing assemblies) and the idler wheel as the track rotates about the idler wheel.

SUMMARY

In one aspect, the present disclosure is related to an idler of an undercarriage assembly for a track-type machine. The undercarriage assembly may include at least two links, which may be interconnected by a cartridge. The cartridge may include a bushing disposed about and rotatable relative to a pin. At least one of the links may include a link rail wear surface, which may be positioned an original wear surface height from the bushing. The idler may include a lower surface, which may be configured to wear against the link rail wear surface. The idler may also include an upper surface, which may be configured to wear against the bushing. The upper surface may be positioned radially outward of the lower surface by an original upper surface height. The original upper surface height may be between approximately 70% and approximately 90% of the original wear surface height.

In another aspect, the present disclosure is related to an undercarriage assembly for a track-type machine. The undercarriage assembly may include an idler, which may include a lower surface and an upper surface. The upper surface may be positioned radially outward of the lower surface. The undercarriage assembly may also include at least two links, which may be interconnected by a cartridge. The cartridge may include a bushing disposed about and rotatable relative to a pin. At least one of the links may include a link rail wear surface, which may be in contact with the lower surface. The link rail wear surface may be positioned an original wear surface height from the bushing. In addition, the undercarriage assembly may include a gap, which may be positioned between the upper surface and the bushing. The gap may include an original gap height, which may be between approximately 10% and approximately 30% of the original wear surface height.

In yet another aspect, the present disclosure is related to a method of operating a track-type machine. The track-type machine may include an undercarriage assembly, which may include an idler, an original link, and an original bushing. The method may include, for a first time period, contacting the original link with the idler without contacting the original bushing with the idler. The method may also include, for a second time period, subsequent to the first time period, contacting the original bushing with the idler.

DETAILED DESCRIPTION

Figure 1:
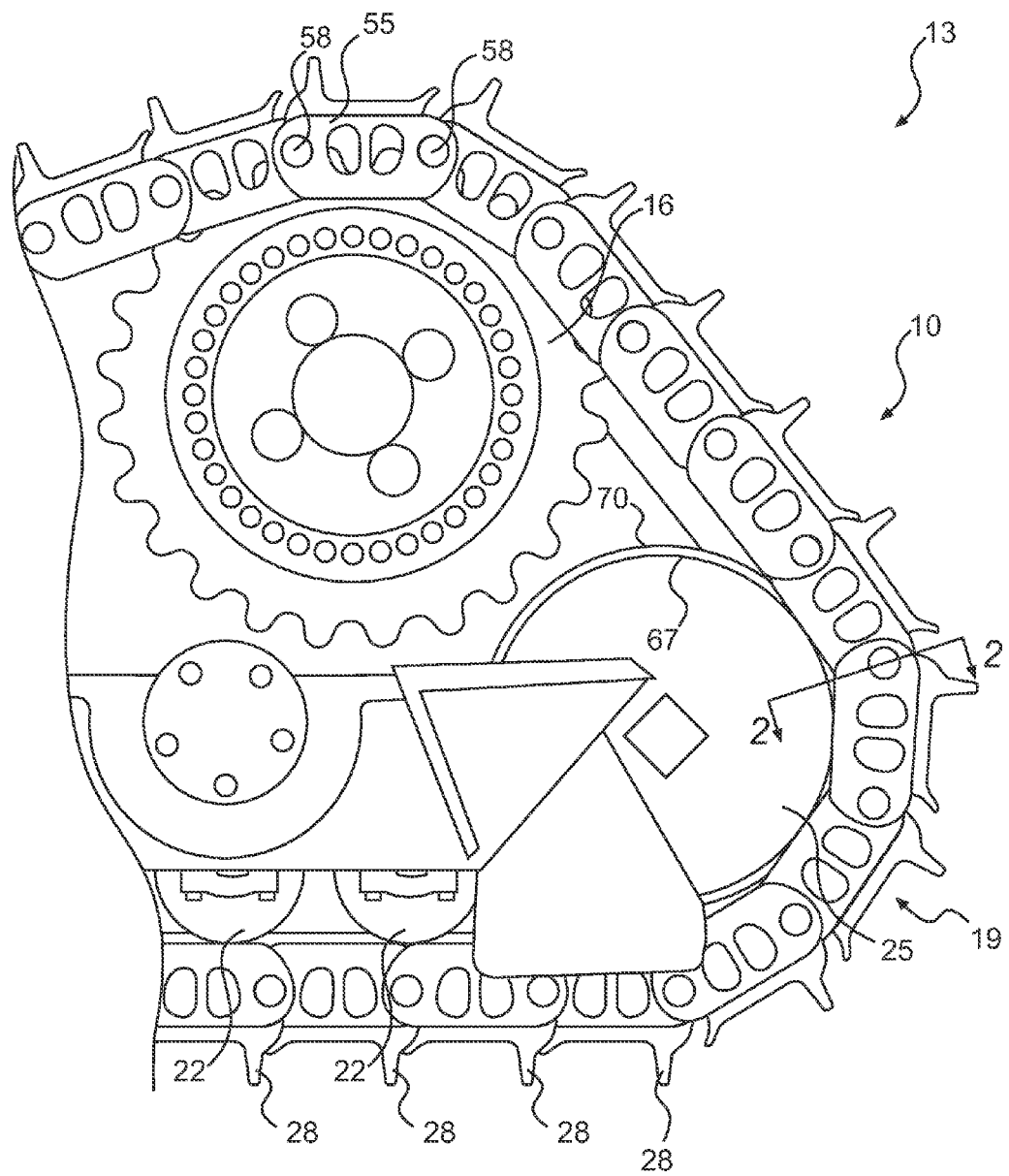
FIG. 1 is a side view of an exemplary disclosed undercarriage assembly for an exemplary disclosed track-type machine.

FIG. 1 illustrates an exemplary undercarriage assembly 10 for a track-type machine 13. For example, machine 13 may be a loader, an excavator, a tractor, a tank, or another mobile machine having track-type traction devices. Undercarriage assembly 10 may include a drive sprocket 16 that propels a track assembly 19. Specifically, sprocket 16 may rotate track assembly 19 about guide rollers 22 and an idler 25. As track assembly 19 rotates, grousers 28 of track assembly 19 may engage a ground surface (not shown) and propel machine 13. Although FIG. 1 shows only one idler 25, it should be understood that sprocket 16 may rotate track assembly 19 about more than one idler.

Figure 2:
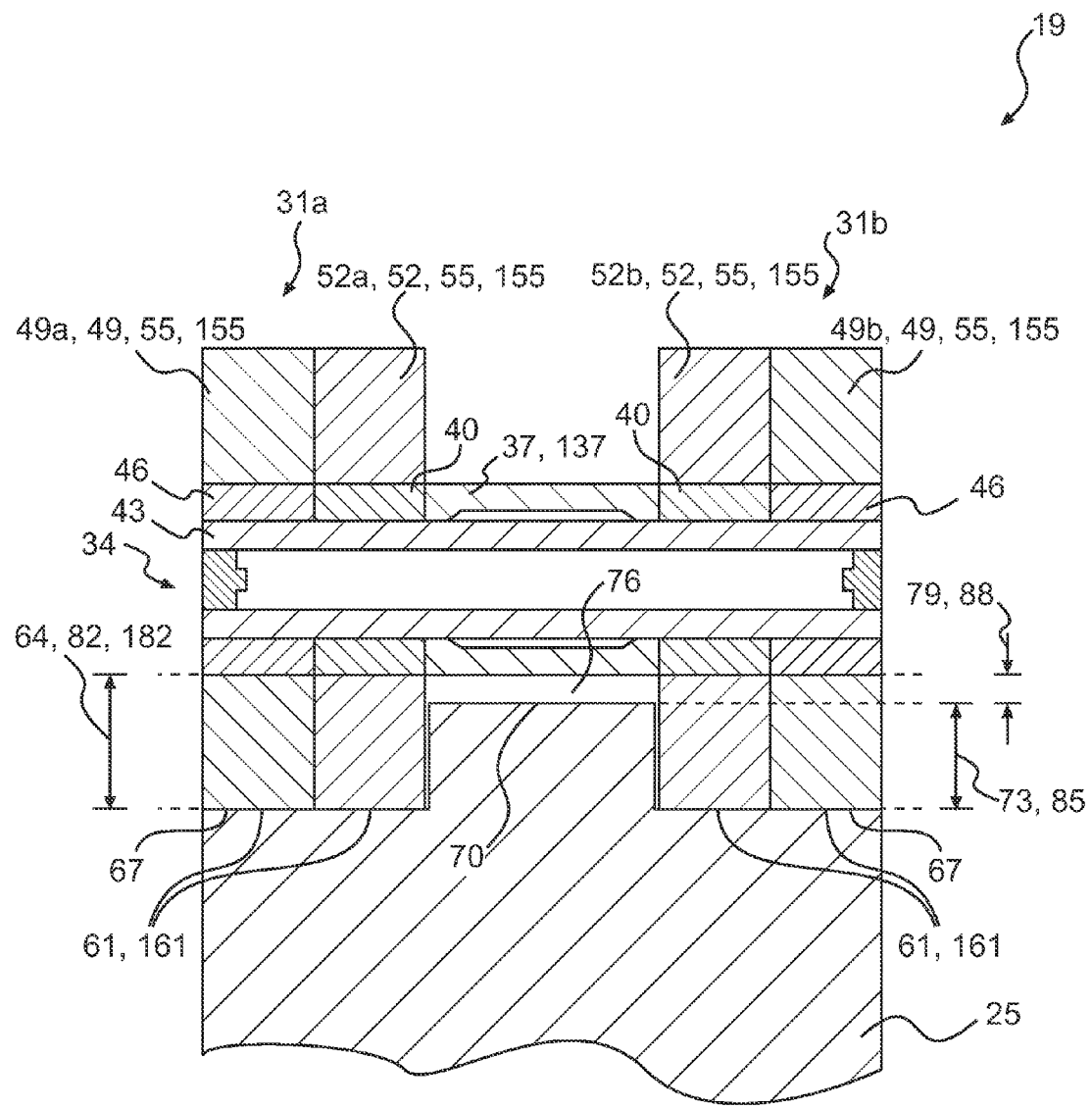
FIG. 2 is a cross-sectional view of an exemplary disclosed idler of the undercarriage assembly of FIG. 1 contacting exemplary disclosed original links of the undercarriage assembly of FIG. 1.

As illustrated in FIG. 2, track assembly 19 may include a pair of parallel track chains 31a and 31b that may be connected by laterally disposed cartridges 34. Each of cartridges 34 (hereafter "cartridge 34") may include a bushing 37, two seal inserts 40, a pin 43, and two collars 46. Bushing 37 may be disposed about pin 43, and may contact and wear against sprocket 16 and/or idler 25 as track assembly 19 rotates about guide rollers 22 and idler 25 (referring to FIGS. 3 and 5). Each of seal inserts 40 may also be disposed about pin 43, and may be connected to either track chain 31a or 31b. Pin 43 may be a hollow cylinder, and may be filled with a lubricant that may flow into and out of pin 43. This lubricant may reduce friction between pin 43, bushing 37, and seal inserts 40, allowing bushing 37 and seal inserts 40 to rotate relative to pin 43. Like seal inserts 40, each of collars 46 may also be disposed about pin 43, and may be connected to either track chain 31a or 31b. Collars 46 may, however, be attached to pin 43.

As previously discussed, cartridges 34 may connect track chains 31a and 31b. For example, cartridge 34 may connect an outer link 49a of track chain 31a, an inner link 52a of track chain 31a, an inner link 52b of track chain 31b, and an outer link 49b of track chain 31b. Outer links 49a and 49b (hereafter "outer links 49") may or may not be equivalent to each other. And, inner links 52a and 52b (hereafter "inner links 52") may or may not be equivalent to each other. Additionally, outer links 49 and inner links 52 may or may not be equivalent to each other. In any case, outer links 49 and inner links 52 (hereafter "links 55") may each include two apertures 58 (referring to FIG. 1). And, seal inserts 40 and/or collars 46 of cartridges 34 may be connected to apertures 58 to connect two or more links 55. Each of links 55 (hereafter "link 55") may also include a link rail wear surface 61, which may be positioned a wear surface height 64 from each of bushings 37 (hereafter "bushing 37"). Wear surface 61 may slideably contact and wear against both of guide rollers 22 and idler 25 as track assembly 19 rotates about guide rollers 22 and idler 25.

Idler 25 may be formed from the same material as link 55 (e.g., steel), and may include a cylindrically shaped lower surface 67 and a cylindrically shaped upper surface 70. Lower surface 67 may be the surface of idler 25 that wear surface 61 of link 55 contacts and wears against as track assembly 19 rotates about guide rollers 22 and idler 25. In other words, wear surface 61 and lower surface 67 may slideably contact and wear against each other as track assembly 19 rotates about guide rollers 22 and idler 25. Upper surface 70 may be positioned laterally adjacent to and radially outward of lower surface 67. Specifically, upper surface 70 may be positioned radially outward of lower surface 67 by an upper surface height 73. In other words, a radius of upper surface 70 (not shown) may be larger than a radius of lower surface 67 (not shown) by upper surface height 73. Upper surface 70 may rotatably contact and wear against bushing 37 as track assembly 19 rotates about guide rollers 22 and idler 25 (referring to FIGS. 3 and 5). Alternatively, idler 25 may include two lower surfaces 67, and upper surface 70 may be positioned laterally between lower surfaces 67.

As previously discussed, wear surface 61 and lower surface 67 may contact and wear against each other as track assembly 19 rotates about guide rollers 22. It should be noted, however, that this contact may prevent upper surface 70 and bushing 37 from contacting and wearing against each other. In particular, as illustrated in FIG. 2, the contact between wear surface 61 and lower surface 67 may form a gap 76 between upper surface 70 and bushing 37. For example, gap 76 may have a gap height 79, which may be equivalent to a difference between wear surface height 64 and upper surface height 73. As wear surface 61 and lower surface 67 contact and wear against each other, it is contemplated that wear surface height 64 may shrink and upper surface height 73 may grow, causing gap height 79 to shrink. Eventually, gap height 79 may shrink to zero, allowing upper surface 70 and bushing 37 to contact and wear against each other (referring to FIGS. 3 and 5, discussed below).

It is contemplated that the contact between upper surface 70 and bushing 37 may commence during a life of link 55. As used herein, the life of link 55 includes a time period during which wear surface height 64 shrinks from an original wear surface height 82 to a minimum acceptable height. For example, wear surface 61 may be positioned original wear surface height 82 from bushing 37 when link 55 is 0% worn (i.e., when link 55 is new). And, wear surface 61 may be positioned the minimum acceptable height from bushing 37 when link 55 is 100% worn (i.e., when link 55 is in need of replacement). Specific points in time during the life of link 55 may be referenced by how worn link 55 is. For example, as previously noted, link 55 may be new when it is 0% worn and may be in need of replacement when it is 100% worn. Link wear percentages at points time between 0% and 100% may be determined using the formula $$P = \frac{O - C}{O - M},$$

where P is the link wear percentage, O is original wear surface height 82, C is wear surface height 64 at a specific point in time during the life of link 55, and M is the minimum acceptable height. Periods of time during the life of link 55 may also be referenced by how worn link 55 is. For example, a period of time may commence when link 55 is 0% worn and may end when link 55 is 50% worn. In addition, lengths of periods of time during the life of link 55 may be referenced by how much link 55 has worn during the periods of time. For example the length of a period of time commencing when link 55 is 30% worn and ending when link 55 is 100% worn may be 70%. In other words, link 55 may wear by 70% during the time period.

The point in time when gap height 79 shrinks to zero may vary according to the relative sizes of original wear surface height 82, an original upper surface height 85, and an original gap height 88. For example, upper surface 70 may be positioned radially outward of lower surface 67 by original upper surface height 85 when link 55 is new. And, gap 76 may have original gap height 88 when link 55 is new. It is contemplated that the point in time when gap height 79 shrinks to zero may affect certain operational characteristics of machine 13. Therefore, the relative sizes of original wear surface height 82, original upper surface height 85, and original gap height 88 may be tailored to achieve desirable operational characteristics of machine 13. For example, undercarriage assembly 10 may be configured to reduce maintenance costs associated with machine 13 and/or to improve a ride quality of machine 13.

The maintenance costs associated with machine 13 may be reduced by configuring undercarriage assembly 10 so as to avoid grouser interference that substantially affects the ride quality of machine 13. Grouser interference occurs when grousers 28 (referring to FIG. 1) engage and dig into the ground surface as a result of contact between track assembly 19 and idler 25. Unfortunately, contact between bushing 37 and idler 25 (upper surface 70) (referring to FIGS. 3 and 5, discussed below) may over time force grousers 28 more deeply into the ground surface than contact between link 55 (wear surface 61) and idler 25 (lower surface 67). Eventually, grouser interference caused by contact between bushing 37 and upper surface 70 may substantially affect the ride quality of machine 13, necessitating maintenance. Specifically, it may become necessary to adjust a height of idler 25 such that the contact between bushing 37 and upper surface 70 no longer forces grousers 28 too deeply into the ground surface.

It is contemplated, however, that the length of time during which bushing 37 and upper surface 70 contact each other may be reduced so as to avoid grouser interference that substantially affects the ride quality of machine 13. For example, the length of time may be sufficiently reduced by sizing original upper surface height 85 such that original gap height 88 is greater than approximately 10% of original wear surface height 82 (i.e., such that original upper surface height 85 is less than approximately 90% of original wear surface height 82). As another example, the length of time may be sufficiently reduced by sizing original upper surface height 85 such that original gap height 88 is greater than approximately 15% of original wear surface height 82 (i.e., such that original upper surface height 85 is less than approximately 85% of original wear surface height 82).

The ride quality of machine 13 may be improved by configuring undercarriage assembly 10 so as to avoid transforming wear surface 61 into a highly curved surface that results in machine 13 having an extremely rough ride. Wear surface 61 may be transformed from a planar surface into an increasingly curved surface as wear surface 61 and lower surface 67 contact and wear against each other. Unfortunately, highly curved wear surfaces 61 of adjacent links 55 can form a highly uneven platform along which guide rollers 22 travel as track assembly 19 rotates about guide rollers 22 and idler 25. This may result in machine 13 having an extremely rough ride. It is contemplated, however, that the length of time during which wear surface 61 and lower surface 67 contact and wear against each other may be reduced so as to avoid transforming wear surface 61 into a highly curved surface that results in machine 13 having an extremely rough ride. For example, the length of time may be sufficiently reduced by sizing original upper surface height 85 such that original gap height 88 is less than approximately 30% of original wear surface height 82 (i.e., such that original upper surface height 85 is greater than approximately 70% of original wear surface height 82).

Although original upper surface height 85 may be sized to either reduce maintenance costs associated with machine 13 or improve a ride quality of machine 13, it is contemplated that original upper surface height 85 may also be sized to both reduce maintenance costs associated with machine 13 and improve a ride quality of machine 13. For example, original upper surface height 85 may be sized such that original gap height 88 is between approximately 10% and approximately 30% of original wear surface height 82 (i.e., such that original upper surface height 85 is between approximately 70% and approximately 90% of original wear surface height 82). As another example, original upper surface height 85 may be sized such that original gap height 88 is between approximately 15% and approximately 30% of original wear surface height 82 (i.e., such that original upper surface height 85 is between approximately 70% and approximately 85% of original wear surface height 82).

Figure 3:
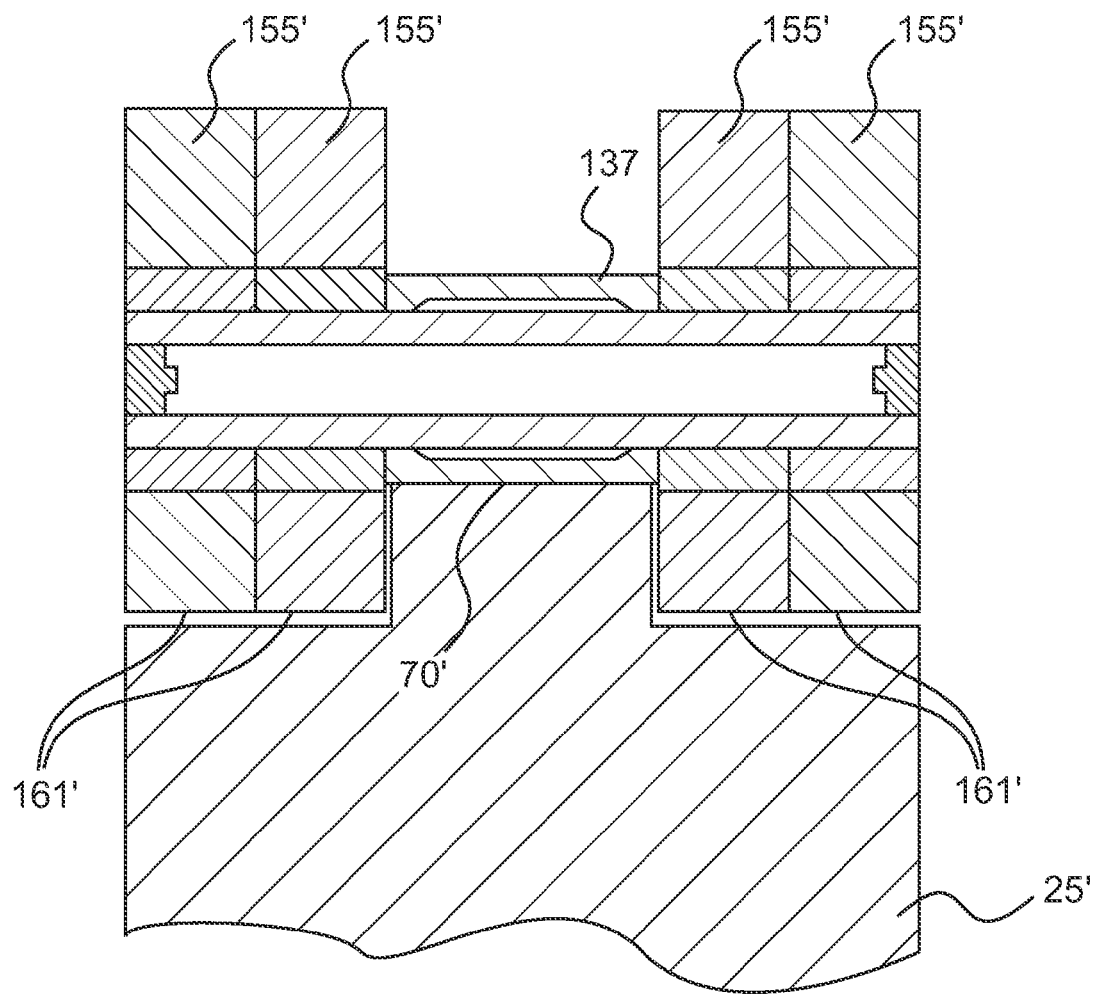
FIG. 3 is a cross-sectional view of an exemplary disclosed first partially worn idler contacting an exemplary disclosed original bushing.

As previously discussed, contact between upper surface 70 of idler 25 and bushing 37 may initially be prevented by contact between wear surface 61 of link 55 and lower surface 67 of idler 25, but may commence during a life of link 55. For example, as illustrated in FIG. 2, contact between upper surface 70 of idler 25 and an original bushing 137 may initially be prevented by contact between a link rail wear surface 161 of an original link 155 and lower surface 67 of idler 25. Wearing between wear surface 161 and lower surface 67 may, however, eventually transform original link 155 into partially worn original link 155', and transform idler 25 into first partially worn idler 25', as illustrated in FIG. 3. These transformations may allow upper surface 70' of first partially worn idler 25' to contact original bushing 137. For example, original upper surface height 85 of idler 25 (referring to FIG. 2) may be sized such that upper surface 70' contacts original bushing 137 when partially worn original link 155' is between approximately 40% and approximately 60% worn.

Figure 4:
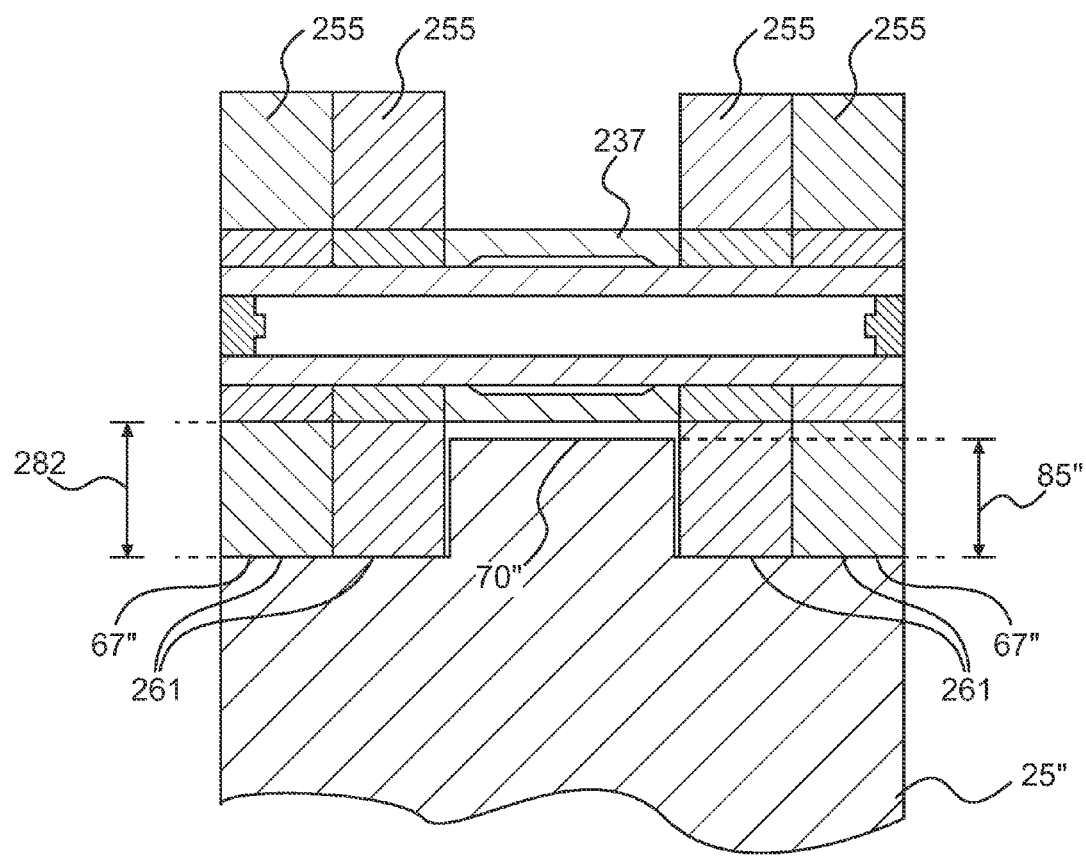
FIG. 4 is a cross-sectional view of an exemplary disclosed second partially worn idler contacting exemplary disclosed replacement links.

Regardless of when upper surface 70' contacts original bushing 137, wearing between wear surface 161' of partially worn original link 155' and guide rollers 22 may eventually necessitate replacement of original link 155. Similarly, wearing between upper surface 70' of first partially worn idler 25' and original bushing 137 may eventually necessitate replacement of original bushing 137. For example, original link 155 may be replaced by replacement link 255, and original bushing 137 may be replaced by replacement bushing 237, as illustrated in FIG. 4. It should be noted that idler 25 may not need to be replaced when original link 155 and original bushing 137 are replaced. Therefore, even though an original wear surface height 282 of replacement link 255 may be equivalent to original wear surface height 182 of original link 155 (referring to FIG. 2), original upper surface height 85" of second partially worn idler 25" may not be equivalent to original upper surface height 85 of idler 25 (referring to FIG. 2).

Figure 5:
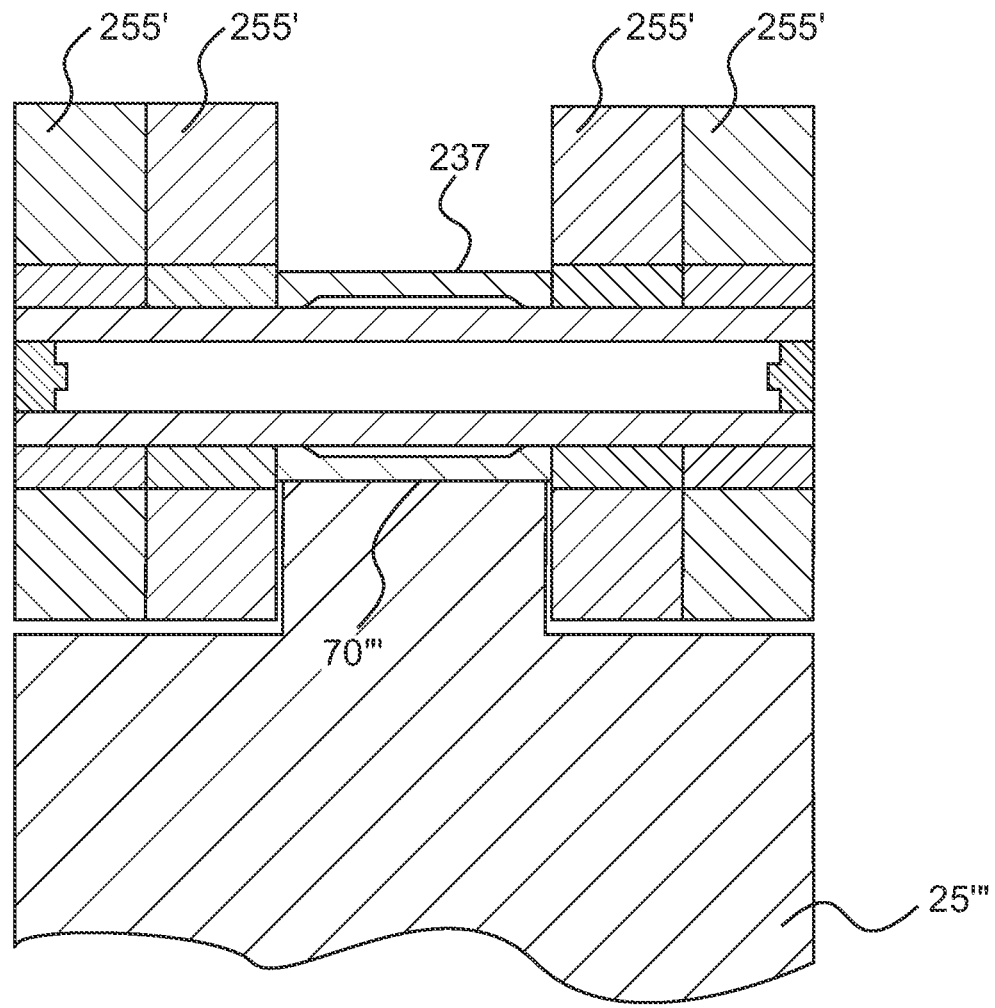
FIG. 5 is a cross-sectional view of an exemplary disclosed third partially worn idler contacting an exemplary disclosed replacement bushing.

Similar to the contact between upper surface 70 and original bushing 137, contact between upper surface 70" of second partially worn idler 25" and replacement bushing 237 may also initially be prevented by contact between a link rail wear surface 261 of replacement link 255 and lower surface 67" of second partially worn idler 25". Wearing between wear surface 261 and lower surface 67" may, however, eventually transform replacement link 255 into partially worn replacement link 255', and transform second partially worn idler 25" into third partially worn idler 25'", as illustrated in FIG. 5. These transformations may allow upper surface 70'" of third partially worn idler 25'" to contact replacement bushing 237. For example, original upper surface height 85" (referring to FIG. 4) may be sized such that upper surface 70'" contacts replacement bushing 237 when partially worn replacement link 255' is between approximately 20% and approximately 40% worn.

Figure 6:
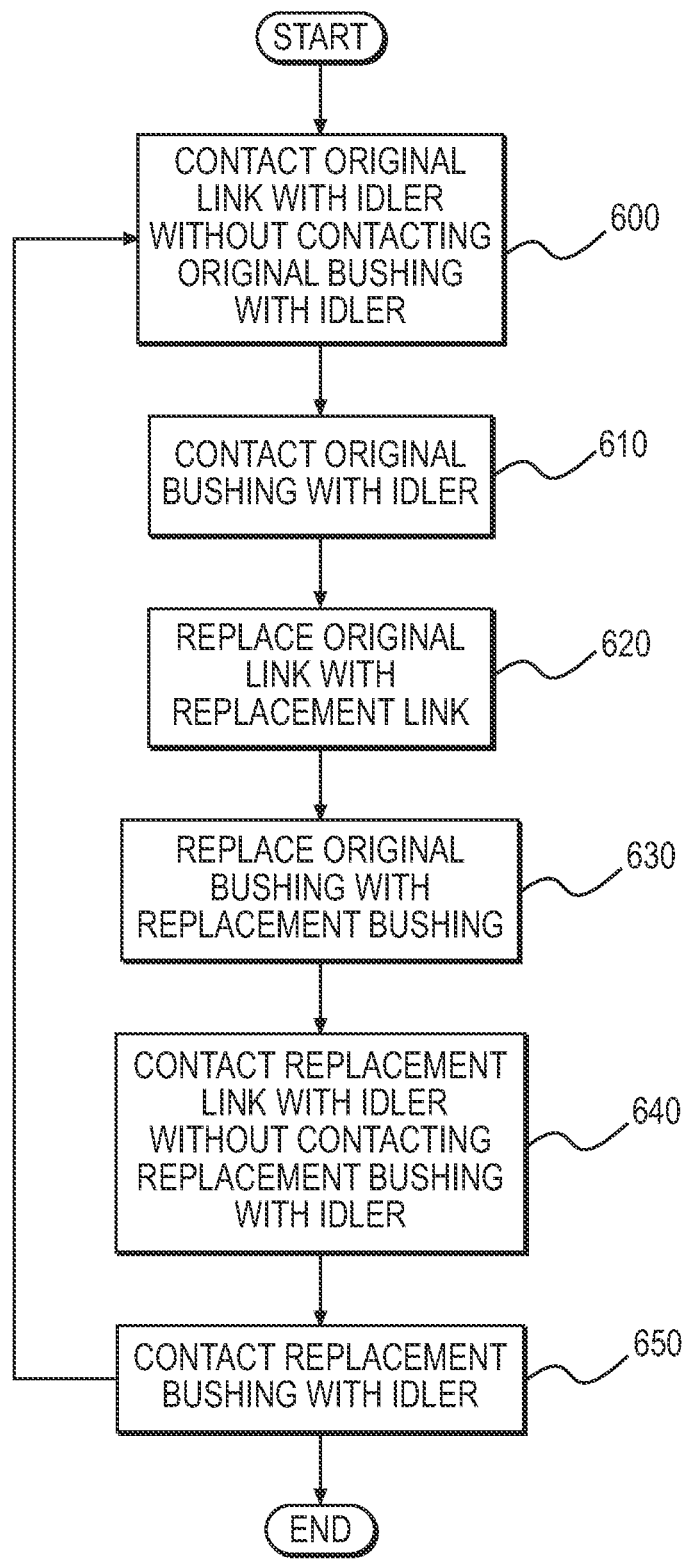
FIG. 6 is a flow chart describing an exemplary disclosed method of operating the track-type machine of FIG. 1.

FIG. 6 illustrates an exemplary method of operating machine 13. FIG. 6 will be discussed in the following section to further illustrate machine 13 and its operation.

Industrial Applicability

In general, an undercarriage assembly may be applicable to track-type machines. The disclosed idler and undercarriage assembly may be particularly beneficial when applied to track-type machines used in abrasive environments. These environments may speed the wearing of parts of the machines. The idler of the undercarriage assembly may be configured such that it ceases contacting links of the undercarriage assembly when the links of the undercarriage assembly are worn by a certain amount. This may reduce maintenance costs associated with the machine and/or improve a ride quality of the machine. Operation of a track-type machine including the disclosed idler and undercarriage assembly will now be described.

As illustrated in FIG. 6, a method of operating the machine may include slideably contacting an original link of the undercarriage assembly with an idler of the undercarriage assembly (step 600). It is contemplated that this contact may initially prevent contact between the idler and an original bushing of the undercarriage assembly. For example, contact between the idler and the original bushing may be prevented for a first time period. Therefore, the idler may not contact the original bushing during the first time period.

Eventually, however, wearing between the idler and the original link, caused by the contact between the idler and the original link, may transform the idler and the original link.

Thus, continued operation of the machine may include rotatably contacting the original bushing with the idler (step 610). For example, this contact may continue for a second time period. It is contemplated that the original link may then be replaced with a replacement link (step 620). This is because wearing between the original link and the idler during the first time period, and between the original link and guide rollers of the undercarriage assembly during the second time period, may necessitate replacement of the original link.

It is also contemplated that original bushing may be replaced with a replacement bushing after the second time period (step 630). This is because wearing between the original bushing and a sprocket of the undercarriage assembly during the first and the second time periods, and between the original bushing and the idler during the second time period, may necessitate replacement of the original bushing. Alternatively, the original bushing may not be replaced after the second time period. This is because the rotatable contact between the original bushing and the idler may wear the original bushing more slowly that the slideable contact between the original link and the idler wears the original link. Thus, the original bushing may not be in need of replacement. It is contemplated, however, that even if the original bushing is not in need of replacement, it may be replaced because the replacement bushing may come preassembled to the replacement link.

After replacing the original link with the replacement link and/or replacing the original bushing with the replacement bushing, continued operation of the machine may include slideably contacting the replacement link with the idler (step 640). It is contemplated that this contact may initially prevent contact between the idler and the replacement bushing (or the original bushing if it has not been replaced). For example, contact between the idler and the replacement bushing (or the original bushing) may be prevented for a third time period. Therefore, the idler may not contact the replacement bushing (or the original bushing) during the third time period.

Eventually, however, wearing between the idler and the replacement link, caused by the contact between the idler and the replacement link, may transform the idler and the replacement link. Thus, continued operation of the machine may include rotatably contacting the replacement bushing (or the original bushing) with the idler (step 650). For example, this contact may continue for a fourth time period. The idler, the replacement link, and the replacement bushing (or the original bushing) may then need to be replaced due to wear between the various components of the undercarriage assembly. After replacements are made, continued operation of the machine may include repeating steps 600-650.

It is contemplated that the lengths of the first, second, third, and fourth time periods may be adjusted by sizing an original upper surface height of the idler. For example, the lengths of the time periods may be adjusted to reduce maintenance costs associated with the machine and/or to improve a ride quality of the machine. In some embodiments, the lengths of the time periods may be adjusted to both reduce maintenance costs associated with the machine and improve a ride quality of the machine, as discussed above in the detailed description. For example, the original upper surface height may be sized such that the original link is worn by between approximately 40% and approximately 60% during the first time period, and such that the replacement link is worn by between approximately 20% and approximately 40% during the third time period.

What is claimed is:

1. An idler of an undercarriage assembly for a track-type machine, the undercarriage assembly including at least two links interconnected by a pin and a bushing, the bushing being rotatable relative to the pin and the links, wherein at least one of the links includes a link rail wear surface, the link rail wear surface being positioned an original wear surface height from the bushing, the idler comprising:
   a lower surface configured to initially contact and wear against the link rail wear surface until the at least one of the links including the link rail wear surface wears to a predetermined point, and
   an upper surface configured to contact and wear against the bushing after the at least one of the links including the link rail wear surface wears to the predetermined point, the upper surface being positioned radially outward of the lower surface by an original upper surface height,
   wherein the original upper surface height is sized between approximately 70% and approximately 90% of the original wear surface height, such that the upper surface contacts the bushing after the at least one of the links including the link rail wear surface wears to the predetermined point and can continue to contact the bushing until the at least one of the links including the link rail wear surface is approximately 100% worn.

2. The idler of claim 1, wherein the original upper surface height is between approximately 70% and approximately 85% of the original wear surface height.

3. The idler of claim 1, wherein the original upper surface height is sized such that the upper surface contacts the bushing when the at least one of the links including the link rail wear surface is between approximately 20% and approximately 60% worn.

4. The idler of claim 3, wherein the original upper surface height is sized such that the upper surface contacts the bushing when the at least one of the links including the link rail wear surface is between approximately 40% and approximately 60% worn.

5. The idler of claim 1, wherein the idler includes two lower surfaces, the upper surface being positioned laterally between the two lower surfaces.

6. An undercarriage assembly for a track-type machine, the undercarriage assembly comprising:
   an idler, including:
      a lower surface, and
      an upper surface, wherein the upper surface is positioned radially outward of the lower surface;
   at least two links interconnected by a pin and a bushing, the bushing being rotatable relative to the pin and the links, wherein:
      at least one of the links includes a link rail wear surface initially in contact with the lower surface until the at least one of the links including the link rail wear surface wears to a predetermined point, the link rail wear surface being positioned an original wear surface height from the bushing; and
   a gap positioned between the upper surface and the bushing, the gap including an original gap height that is between approximately 10% and approximately 30% of the original wear surface height, such that the upper surface contacts the bushing after the at least one of the links including the link rail wear surface wears to the predetermined point and can continue to contact the bushing until the at least one of the links including the link rail wear surface is approximately 100% worn.

7. The undercarriage assembly of claim 6, wherein the original gap height is between approximately 15% and approximately 30% of the original wear surface height.

8. The undercarriage assembly of claim 6, wherein the idler includes two lower surfaces, the upper surface being positioned laterally between the two lower surfaces.

9. The undercarriage assembly of claim 6, wherein the links and the idler are formed from the same material.

10. The undercarriage assembly of claim 6, wherein the upper surface is positioned radially outward of the lower surface by an original upper surface height, the original upper surface height being sized such that the upper surface contacts the bushing when the at least one of the links including the link rail wear surface is between approximately 20% and approximately 60% worn.

11. The undercarriage assembly of claim 10, wherein the original upper surface height is sized such that the upper surface contacts the bushing when the at least one of the links including the link rail wear surface is between approximately 40% and approximately 60% worn.

12. A method of operating a track-type machine, the track-type machine including an undercarriage assembly having an idler, an original link, and an original bushing rotatable relative to the original link, the method comprising:
- for a first time period until the original link is between approximately 20% and approximately 60% worn, contacting the original link with the idler without contacting the original bushing with the idler; and
- for a second time period, subsequent to the first time period, contacting the original bushing with the idler until the original link is approximately 100% worn.

13. The method of claim 12, further including:
subsequent to the second time period, replacing the original link with a replacement link; and
for a third time period, contacting the replacement link with the idler without contacting the original bushing with the idler.

14. The method of claim 13, further including, for a fourth time period, subsequent to the third time period, contacting the original bushing with the idler.

15. The method of claim 12, further including:
subsequent to the second time period, replacing the original link with a replacement link, and replacing the original bushing with a replacement bushing; and
for a third time period, contacting the replacement link with the idler without contacting the replacement bushing with the idler.

16. The method of claim 15, further including, for a fourth time period, subsequent to the third time period, contacting the replacement bushing with the idler.

17. The method of claim 16, wherein the replacement link is worn by between approximately 20% and approximately 40% during the third time period.

18. The method of claim 17, wherein the original link is worn by between approximately 40% and approximately 60% during the first time period.

19. The method of claim 12, wherein contacting the original bushing with the idler includes rotatably contacting the original bushing with the idler.

20. The method of claim 12, wherein contacting the original link with the idler includes slideably contacting the original link with the idler.

* * * * *